United States Patent [19]

Duemmler

[11] Patent Number: 5,275,320
[45] Date of Patent: Jan. 4, 1994

[54] ROOF LUGGAGE CARRIER FOR MOTOR VEHICLES WITH ROOF RAILING

[75] Inventor: Stephan Duemmler, Im Jochert, Fed. Rep. of Germany

[73] Assignee: Votex, GmbH, Dreieich, Fed. Rep. of Germany

[21] Appl. No.: 848,846

[22] Filed: Mar. 10, 1992

[30] Foreign Application Priority Data

Mar. 13, 1991 [DE] Fed. Rep. of Germany ....... 4108058

[51] Int. Cl.⁵ .............................................. B60R 9/058
[52] U.S. Cl. ................................. 224/319; 224/321; 224/322; 224/330; 224/331
[58] Field of Search ............... 224/309, 315, 319, 321, 224/322, 323, 325, 326, 327, 329, 330, 331; 296/37.7, 40; 248/316.6, 503, 689

[56] References Cited

U.S. PATENT DOCUMENTS

| | | | |
|---|---|---|---|
| 4,487,348 | 12/1984 | Mareydt | 224/309 |
| 4,757,929 | 7/1988 | Nelson | 224/322 X |
| 4,778,092 | 10/1988 | Grace | 224/322 X |

FOREIGN PATENT DOCUMENTS

| | | | |
|---|---|---|---|
| 205414 | 12/1986 | European Pat. Off. | 224/321 |
| 3428154 | 2/1986 | Fed. Rep. of Germany | 224/321 |
| 3510805 | 10/1986 | Fed. Rep. of Germany | 224/309 |
| 3626479 | 2/1988 | Fed. Rep. of Germany | 224/321 |
| 3-8157 | 2/1990 | Japan | 224/315 |
| 2-38158 | 2/1990 | Japan | |

OTHER PUBLICATIONS

Happich, Figure of roof jack assembly, Apr. 1988.

Primary Examiner—Henry J. Recla
Assistant Examiner—Glenn T. Barrett
Attorney, Agent, or Firm—Cort Flint

[57] ABSTRACT

The invention relates to a roof luggage carrier for motor vehicles with roof railing having transverse girders (2) and a removable clamping assembly (3). The clamping assembly (3) includes supporting jaws (5) that can be inserted in a lower longitudinal slot (11) on the transverse girder (2), and of clamping jaws (6). The clamping assembly (3) is actuated by means of a clamping screw bolt (8) which extends inside the transverse girder (2) in its longitudinal direction. This makes it possible to achieve simple assembly and easy handling. In another preferred embodiment the longitudinal edges of longitudinal slot (11) are provided with longitudinal edges (12, 13) which are surrounded by longitudinal grooves in the supporting jaws (5) and clamping jaws 6, so that widening of the longitudinal slot (11) when tilting stresses occur is prevented.

12 Claims, 1 Drawing Sheet

ROOF LUGGAGE CARRIER FOR MOTOR VEHICLES WITH ROOF RAILING

BACKGROUND OF THE INVENTION

The invention relates to a roof luggage carrier for motor vehicles with roof railings.

Known roof railings consist of two railing pipes extending longitudinally on either side of the vehicle roof on motor vehicles, in particular on utility vehicles and off-the-road vehicles. These railing pipes are connected fixedly to the roof at the time of manufacture of the vehicle and remain permanently on the vehicle.

The roof railing or the railing pipes serve as a holding device for detachable roof superstructures, in particular for the attachment of transverse girders of a roof luggage carrier. Such a transverse girder extends in a known manner from one railing pipe to the other and is attached by means of detachable clamping devices on the railing pipes and held in place thereon.

A number of clamping and retaining devices are already known. For example, a known clamping and retaining device (De PS 35 10 805) is made in the form of a claw which reaches around the appertaining railing rod in a swivelling motion and can be clamped in place thereon. To make this clamping device an additional, swivelling claw element and elastic deformation of the claw body is required, so that the arrangement becomes expensive.

Another known clamping and retaining device on a transverse roof luggage carrier (De PS 35 16 483) consists of a plurality of clamping elements and retaining screws so that manufacture as well as cost is expensive.

In a simple and known clamping and retaining device (DE PS 31 04 163) only one clamping clip is used which surrounds the railing pipe from below and which can be clamped with a retaining screw capable of being tightened from above through the transverse girder. The retaining screw extends at a right angle in the direction of the transverse girder. In order to prevent theft it can only be covered with a long extension at a front cover at high cost. In addition, the installation on, and the removal of the roof luggage carrier from the roof railing is slow and awkward since the entire clamping clip arrangement must be removed.

In a known attachment arrangement of a roof luggage carrier on a roof railing (DE OS 32 23 216) the transverse carrier is provided with a supporting leg at each end on which a clamping and retaining device is installed. Each supporting leg is in the form of a clamping jaw arrangement which surrounds the railing pipe and can be attached to the railing pipe by means of a retaining screw. The supporting leg is attached from the underside with screws or rivets (FIG. 6). The retaining screw can be covered by a forward cover which can be displaced in the transverse girder by a rather complicated spring arrangement. This roof luggage carrier attachment is also relatively costly in design, manufacture and handling. An adaptation to different railing pipes is not provided.

Based on this state of the art, it is an object of the invention to further develop a roof luggage carrier of this type for motor vehicles with roof railings so that the attachment means can be assembled easily, is of low cost in the manufacture, and is easily handled.

SUMMARY OF THE INVENTION

The above object is accomplished according to the present invention by providing a transverse girder having a hollow profile with a longitudinal slot in each underside end of the transverse girder. In each longitudinal slot there is a supporting jaw and a clamping jaw inserted one after the other in the longitudinal direction of the transverse girder. An upper jaw element is located in the hollow profile for this purpose, and a lower jaw element projects down towards the railing pipe. The two supporting jaws attached to the transverse girder are placed towards the center of the vehicle and are attached at a distance of the railing pipes. In the upper jaw element of the supporting jaws a threaded bore extends in the longitudinal direction of the transverse girder, and is accessible in the hollow profile from the front end of the transverse girder. The moveable clamping jaws are located towards the outside of the vehicle and can be displaced along the longitudinal slots. A clamping connection with this supporting jaw is made by a clamping screw bolt through a bore extending axially with the threaded bore in the supporting jaw in a longitudinal direction of the transverse girder.

The lower jaw element of each clamping jaw is made in the form of a claw which surrounds the railing pipe at least in part in order to provide retention of the transverse girder when attaching the clamping device or when tightening the clamping screw bolt. To attach the luggage carrier, the clamping screw bolts are then loosened on either side, so that the clamping device opens towards the transverse girder as a result of the clamping jaws being displaced. Subsequently the transverse girder is placed with the supporting jaws, which are at the distance of the railing pipes from each other, between the railing pipes and the clamping screw bolts are tightened. This causes the clamping device to be closed and the transverse girder to be fixedly connected to the railing pipes. It is evident that the installation and the removal of a roof luggage carrier made in this manner can be carried out easily with only little handling. The clamping device can be installed securely and by easy means so that the overall structure can be assembled with few parts and at low cost. The adjustable installation of the clamping jaw in their respective longitudinal slots can be carried out very easily and without using any additional components. It is a further advantage of the arrangement that the clamping screw bolts extend in the longitudinal direction of the transverse girder and inside the hollow profile. They are protected significantly against environmental influences and corrosion. Furthermore, the introduction of a tool to the clamping screw bolts can be easily prevented by means of a simple cover at the outer end of the transverse girder, so that the roof luggage carrier can easily be protected against removal and theft.

The supporting jaws and clamping jaws are each provided with lateral longitudinal grooves between each lower jaw element and upper jaw element to receive longitudinal edges which define the corresponding longitudinal groove. Each lower jaw element and the upper jaw element are connected to each other by a central element in the area of the longitudinal grooves, whereby this central element establishes the connection through the longitudinal groove. The supporting jaws and clamping jaws are held securely and firmly in the longitudinal groove by such longitudinal edges in an appropriate layout, whereby the adjusting movement of the clamping jaws can also be executed through the longitudinal grooves.

With a greater roof load, great stresses in the direction of travel are imposed upon the roof luggage carrier during braking and acceleration of the vehicle. When the supporting jaws and clamping jaws are installed according to the invention in each longitudinal groove in the ends of the hollow profile of the transverse girder, a tilting load is imposed upon the transverse girder. This tends to cause a deformation and a widening of the longitudinal grooves together with a loosening of the connection between the transverse girder and the supporting jaws and clamping jaws. In order to establish as stable a connection as possible in this critical area, it is proposed in an especially preferred embodiment that the longitudinal edges of each longitudinal groove be provided with guiding ribs which project towards the interior of the hollow profile or upward. In this way the area around the longitudinal edges is generally reinforced. Furthermore, the longitudinal grooves in the supporting jaws and clamping jaws are made with a corresponding profile which receives the guiding ribs and co-extends with them. Thus, the longitudinal groove cannot become wider, since the guiding ribs are held together by the engagement of the supporting jaws and clamping jaws on the guiding ribs. A secure and stable seating of the supporting jaws and clamping jaws on the transverse girder can thus be realized in the presence of relatively thin walls of the hollow profile and of the guiding ribs.

To compensate and to adapt a roof luggage carrier to changing distances between railing pipes such as occur for instance from front to back of the vehicle, the invention provides that at least one supporting jaw can be attached to the transverse girder by means of an attaching device so that it can be adjusted. If the adaptation required is not too great it suffices for one supporting jaw to be made so that it can be shifted by means of a detachable connection to its corresponding longitudinal groove. The other supporting jaw can be permanently attached after assembly by inserting it into its corresponding longitudinal groove, e.g. by bonding or riveting.

An installation device to attach a supporting jaw to the transverse girder so that it can be unfastened is proposed by the invention. The installation device consists of a clamping screw which comes up from below and is provided in the area of the grooves. The clamping screw can be screwed into the supporting jaw and into a clamping element which fits over the edges of the groove from the outside. It is easy to effect adjustments and adaptation with such an installation device. The adaptation to the distances is carried out before the clamping devices are tightened on the railing pipes, for which the transverse girder must be tilted so that the clamping screw becomes accessible. Once the clamping device has been tightened the screw head of the clamping screw faces down towards the roof and is therefore practically no longer accessible to a tool, because of the small distance between the top of the roof and the transverse girder. The roof luggage carrier is protected against removal and theft. It is possible to cover up the longitudinal groove against environmental influences by means of an extension at the supporting jaw, in the area of the adaptation and adjustment space.

When a known frontal cover at the outer end of the transverse girder is used, access to the clamping screw bolts located in the hollow profile is prevented, so that unauthorized removal of the luggage carrier is prevented. The frontal cover is designed to cover a longitudinal channel in front which is open on top, so that accessory parts inserted into the longitudinal channel are also secured against removal.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
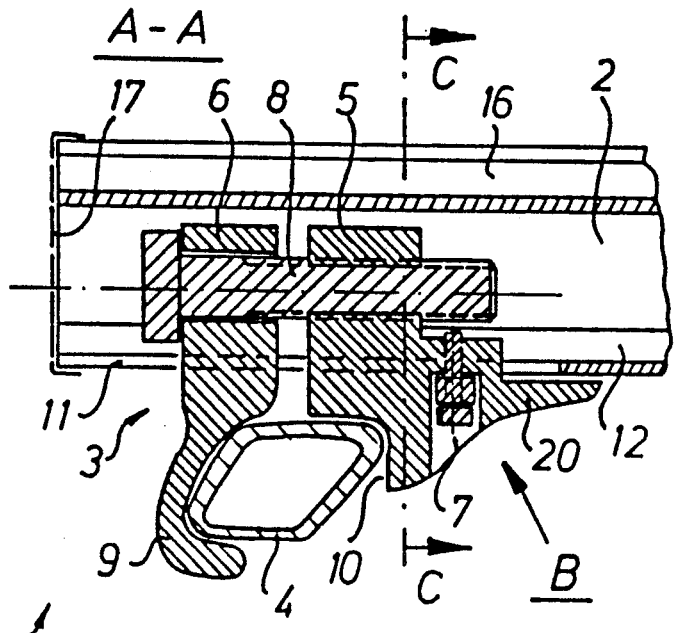
FIG. 1 illustrates a longitudinal section through a transverse girder of a roof luggage carrier along line A—A of FIG. 2 according to the invention in the area of a clamping device which can be unfastened.
Figure 3:
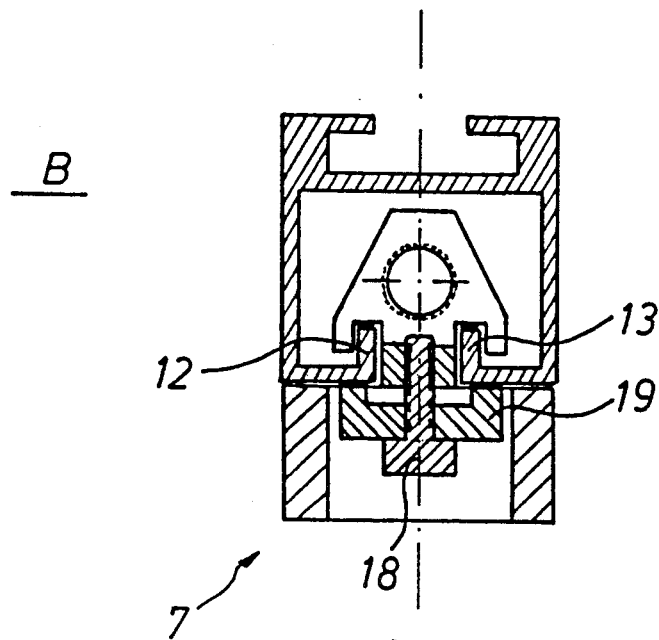
FIG. 3 is an enlarged representation of a fastening device (area B) on a supporting jaw according to the invention.

Referring now in more detail to the drawings, FIG. 1 shows a partial end section of a roof luggage carrier 1 of a motor vehicle with roof railing. The roof luggage carrier consists essentially of a transverse girder 2 having a hollow profile and a clamping assembly 3 for attachment to a railing pipe 4 of the roof railing. The clamping assembly 3 comprises a supporting jaw 5 on the side toward the center of the vehicle and a clamping jaw 6 on the outer side of the vehicle which is held in such a manner that it can be adjusted in the longitudinal direction of transverse girder 2. The supporting jaw 5 is attached to transverse girder 2 by means of a connecting device 7 (shown in an enlargement in FIG. 3). Clamping jaw 6 is connected in relation to it by means of a clamping screw bolt 8 in such a manner that it can be shifted and adjusted. This clamping screw bolt extends within the upper jaw element inside and in the longitudinal direction of the hollow profile of the transverse girder 2. The lower element of the clamping jaw 6 is made in the form of a claw 9 reaching around the railing pipe. On the supporting jaw 5, on the other hand, only a vertical contact surface 10 is provided. The transverse girder can be installed from the top between the railing pipes 4 with the supporting jaws 5 and the clamping assembly 3 being open.

Figure 2:
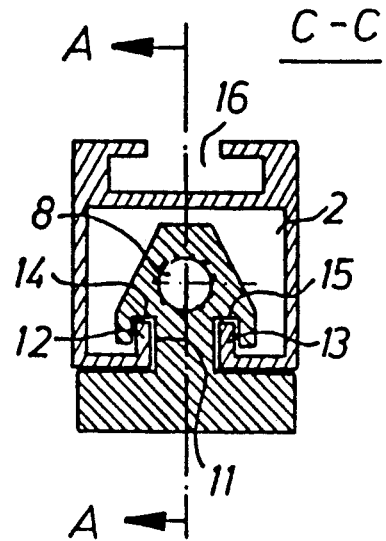
FIG. 2 illustrates a cross-section along line C—C of FIG. 1.

The supporting jaws 5 and the clamping jaws 6 are mounted and held in a longitudinal slot 11 on the underside and towards the lateral side of the transverse girder 2 (see also cross-section as in FIG. 2). Guiding ribs 12, 13 form an integral part of the longitudinal edges of the longitudinal slot 11 and stand up towards the inside of the hollow profile, i.e. are directed upward. The supporting jaws 5 and clamping jaws 6 include corresponding longitudinal grooves 14, 15 with a profile configuration which receives and surrounds the guiding ribs 12, 13 laterally.

The transverse girder 2 includes a longitudinal channel 16 open at the top and provided with undercuts in order to receive in a known manner accessories such as bicycle carrier, boat carriers, etc. which can be inserted laterally into the longitudinal channel 16. The forward ends of the transverse girder 2 can be covered by means of a forward cover 17 (known and schematically drawn) which can be locked from the outside with a lock. In this way the hollow profile of the transverse girder 2 is on the one hand protected against the entry of moisture and dirt and on the other hand the lateral insertion opening of the longitudinal channel 16 and clamping screw bolt 8 are covered. Therefore no accessory can be taken from the longitudinal channel 16, nor can the entire roof luggage carrier be removed through unauthorized loosening of clamping screw bolt 8 once the forward cover 17 has been locked.

At least one of the facing supporting jaws 5 on the transverse girder 2 can be shifted within the longitudinal slot 11 in adaptation to the railing pipes 4. The supporting jaw can be fixed in place by means of the connecting device 7. The connecting device consists of a clamping screw 18 which is screwed from below into the supporting jaw 5 and a clamping element 19 which covers the slot edges of the longitudinal slot 11. Next to the area or connecting device 7, an extension 20 pointing toward the center of the vehicle is integrally connected. It does not enter into the longitudinal slot 11 and covers it from the outside within the range of shifting and adaptation.

The illustrated embodiment has the following operation. To install the roof luggage carrier, the supporting jaws 5 and the clamping jaws 6 are inserted from both sides into the corresponding longitudinal slots 11. The supporting jaws 5 are then attached by means of the connecting device 7 and are adjusted to the distance between the railing pipes 4 so that the contact surfaces 10, as seen from the center of the vehicle, are applied against the railing pipes 4. By loosening clamping screw bolt 8, the clamping assemblies 3 are opened and the transverse girder is placed over the railing pipes 4 via the clamping assemblies. The clamping screw bolts 8 are then screwed in with a tool, causing clamping jaw 6 with its lower claw 9 to reach around its corresponding railing pipe 4, clamping and holding it in a positively interlocking manner. The holding devices and accessories can then be introduced into the longitudinal slot 16 and the forward cover 17 can be closed and locked to secure it against theft.

When tilting stresses act upon the transverse girder 2, e.g. during braking or acceleration processes, a widening of the longitudinal slot 11 is counteracted by the longitudinal grooves 14, 15 surrounding the guiding ribs 12, 13 so that the longitudinal slot 11 is held together by its slot edges. In conclusion it must be noted that a simply constructed and easily handled roof luggage carrier for motor vehicles with roof railing is made available through the object of this application.

While a preferred embodiment of the invention has been described using specific terms, such description is for illustrative purposes only, and it is to be understood that changes and variations may be made without departing from the spirit or scope of the following claims.

What is claimed is:

1. A roof luggage carrier for motor vehicles with a roof railing which includes two railing pipes extending on a vehicle roof of said vehicle in a longitudinal direction on opposite sides of the vehicle, a transverse girder serving as a transverse luggage carrier rod which extends from one railing pipe to the other, and a detachable clamping assembly carried near opposing ends of said transverse girder and being adapted to attach the transverse girder to the railing pipes, said carrier comprising:

said transverse girder having opposing ends and a hollow profile;
   a longitudinal slot formed in an underside of said transverse girder near said opposing ends;
   said clamping assembly including a supporting jaw and a clamping jaw disposed partially in said longitudinal slot, and said supporting and clamping jaws having upper jaw elements disposed within said hollow profile and lower jaw elements projecting downward from said longitudinal slot;
   said supporting jaws being adapted to be placed towards a center of the vehicle for engagement with said transverse girder at a distance which separates said railing pipes;
   a threaded bore included in said upper jaw element of said supporting jaws extending in a longitudinal direction of the transverse girder which is accessible from an opposing end of said transverse girder;
   said clamping jaws being adapted to be placed towards an outside of the vehicle, and being moveable along said longitudinal slot;
   a clamping screw bolt extending through said upper element of said clamping jaw in the longitudinal direction of said transverse girder for connection to said threaded bore and supporting jaw;
   said lower jaw element of said clamping jaw having a claw which is adapted to be at least part of said railing pipe to hold said transverse girder to said railing pipe when said clamping assembly is fastened and said clamping screw bolt is tightened;
   said supporting jaw and clamping being provided with longitudinal grooves extending between said lower jaw element and upper jaw elements to receive longitudinal edges of said longitudinal slot of said transverse guide so that said lower jaw element and upper jaw element are connected to said transverse girder by said longitudinal edges and grooves; and
   said longitudinal edges of said longitudinal slots are provided with guiding ribs which project upwards into said hollow profile, and said longitudinal grooves of said clamping and supporting jaws receive said guiding ribs in a corresponding profile of said longitudinal grooves.

2. The carrier of claim 1 wherein at least one supporting jaw is attached by a connecting means to said transverse girder in such manner that it can be shifted along said longitudinal slot and can then be affixed so that the distance between the supporting jaws can be adjusted to the distance between the railing pipes.

3. The carrier of claim 2 wherein said connecting means includes a screw extending into said longitudinal slot and sprewed into said supporting jaw, and a clamping element connected to said screw and being disposed below and covering said longitudinal edges of said slot.

4. The carrier of claim 1 wherein said supporting jaw is provided with an extension which does not engage said longitudinal slot and covers said longitudinal slot.

5. The carrier of claim 1 wherein said transverse girder includes a longitudinal channel on a top thereof provided with undercuts to receive accessories.

6. A roof luggage carrier for motor vehicles with a roof railing which includes two railing pipes extending on a vehicle roof of said vehicle in a longitudinal direction on opposing sides of the vehicle, a transverse girder extending from one railing pipe to the other, and a detachable clamping assembly carried near opposing ends of said transverse girder and being adapted to attach the transverse girder to the railing pipes; said carrier comprising:

said transverse girder having a hollow profile;

a longitudinal slot formed in an underside of said transverse girder near said opposing ends;

said clamping assembly including a supporting jaw and a clamping jaw disposed partially in said longitudinal slot, and said supporting and clamping jaws having upper jaw elements disposed within said hollow profile and lower jaw elements projecting downward from said longitudinal slots;

said supporting jaws being adapted to be placed towards a center of the vehicle for engagement with said transverse girder at a distance which separates railing pipes;

said clamping jaws being adapted to be placed towards an outside of the vehicle, and being moveable along said longitudinal slot;

clamping means for tightly clamping said clamping jaws and said supporting jaws about said railing pipes;

said lower jaw element of said clamping jaw having a claw which is adapted to encircle at least part of said railing pipe to hold said transverse girder to said railing pipe when said clamping means is tightened and said clamping assembly is fastened;

said supporting jaws and the clamping jaws are provided with longitudinal grooves extending between said lower jaw elements and upper jaw elements to receive a pair of longitudinal edges of said longitudinal slot so that said lower jaw element and upper jaw element are connected to said transverse girder by said longitudinal edges and grooves;

said longitudinal edges of said longitudinal slots are provided with guiding ribs which project upwards into said hollow profile, and said longitudinal grooves receive said guiding ribs in a corresponding profile.

7. The carrier of claim 6 wherein at least one supporting jaw is attached by a connecting means to said transverse girder in such manner that it can be shifted along said longitudinal slot and can then be affixed so that the distance between the supporting jaws can be adjusted to the distance between the railing pipes.

8. The carrier of claim 7 wherein said connecting means includes fastening means extending into said longitudinal slot and fastened to said supporting jaw, and a clamping element connected to said fastener means and being disposed below and covering said longitudinal edges of said slot.

9. The carrier of claim 6 wherein said clamping means includes a clamping bolt extending in the longitudinal direction of said transverse girder.

10. The carrier of claim 6 wherein said transverse girder includes longitudinal channel on a top thereof and provided with undercuts to receive accessories.

11. A roof luggage carrier for motor vehicles with a roof railing which includes two railing pipes extending on a vehicle roof of said vehicle in a longitudinal direction on opposite sides of the vehicle, a transverse girder serving as a transverse luggage carrier rod which extends from one railing pipe to the other, and a detachable clamping assembly carried near opposing ends of said transverse girder and being adapted to attach the transverse girder to the railing pipes, said carrier comprising:

said transverse girder having opposing ends and a hollow profile;

a longitudinal slot formed in an underside of said transverse girder near said opposing ends;

said clamping assembly including a supporting jaw and a clamping jaw disposed partially in said longitudinal slot, and said supporting and clamping jaws having upper jaw elements disposed within said hollow profile and lower jaw elements projecting downward from said longitudinal slot;

said supporting jaws being adapted to be placed towards a center of the vehicle for engagement with said transverse girder at a distance which separates said railing pipes;

a threaded bore included in said upper jaw element of said supporting jaws extending in a longitudinal direction of the transverse girder which is accessible from an opposing end of said transverse girder;

said clamping jaws being adapted to be placed towards an outside of the vehicle, and being moveable along said longitudinal slot;

a clamping screw bolt extending through said upper element of said clamping jaw in the longitudinal direction of said transverse girder for connection to said threaded bore and supporting jaw;

said lower jaw element of said clamping jaw having a claw which is adapted to encircle at least part of said railing pipe to hold said transverse girder to said railing when said clamping assembly is fastened and said clamping screw bolt is tightened;

at least one supporting jaw being attached by a connecting means to said transverse girder in such manner that it can be shifted along longitudinal slot and can then be affixed so that a distance between opposing ones of said supporting jaws can be adjusted to the distance between the railing pipes;

said connecting means extending into said longitudinal slot and fastened into said supporting jaw, and a clamping element attached to said longitudinal edges of said longitudinal slot and covering said connecting means.

12. A roof luggage carrier for motor vehicles with a roof railing which includes two railing pipes extending on the vehicle roof of said vehicle in a longitudinal direction on opposing sides of the vehicle, a transverse girder extending from one railing pipe to the other, and a detachable clamping assembly carried near opposing ends of said transverse girder and being adapted to attach the transverse girder to the railing pipes;

said carrier comprising:

said transverse girder having a hollow profile;

a longitudinal slot formed in an underside of said transverse girder near said opposing ends;

said clamping assembly including a supporting jaw and a clamping jaw disposed partially in said longitudinal slot, and said supporting and clamping jaws having upper jaw elements disposed within said hollow profile and lower jaw elements projecting downward from said longitudinal slots;

said supporting jaws being adapted to be placed towards a center of the vehicle for engagement with said transverse girder at a distance which separates said railing pipes;

said clamping jaws being adapted to be placed towards an outside of the vehicle, and being moveable along said longitudinal slot;

clamping means for tightly clamping said clamping jaws and said supporting jaws about said railing pipes;

said lower jaw element of said clamping jaw having a claw which is adapted to encircle at least part of said railing pipe to hold said transverse girder to said railing when said clamping means is tightened and said clamping assembly is fastened;

at least one supporting jaw being attached by a connecting means to said transverse girder in such manner that it can be shifted along said longitudinal slot and can then be affixed so that a distance between opposing ones of said supporting jaws can be adjusted to said distance between the railing pipes; and said connecting means extending into said longitudinal slot and fastened into said supporting jaw, and a clamping element attached to longitudinal edges of said longitudinal slot and covering said connecting means.

* * * * *